(No Model.)
A. J. SMITH.
HARNESS.
No. 427,630. Patented May 13, 1890.
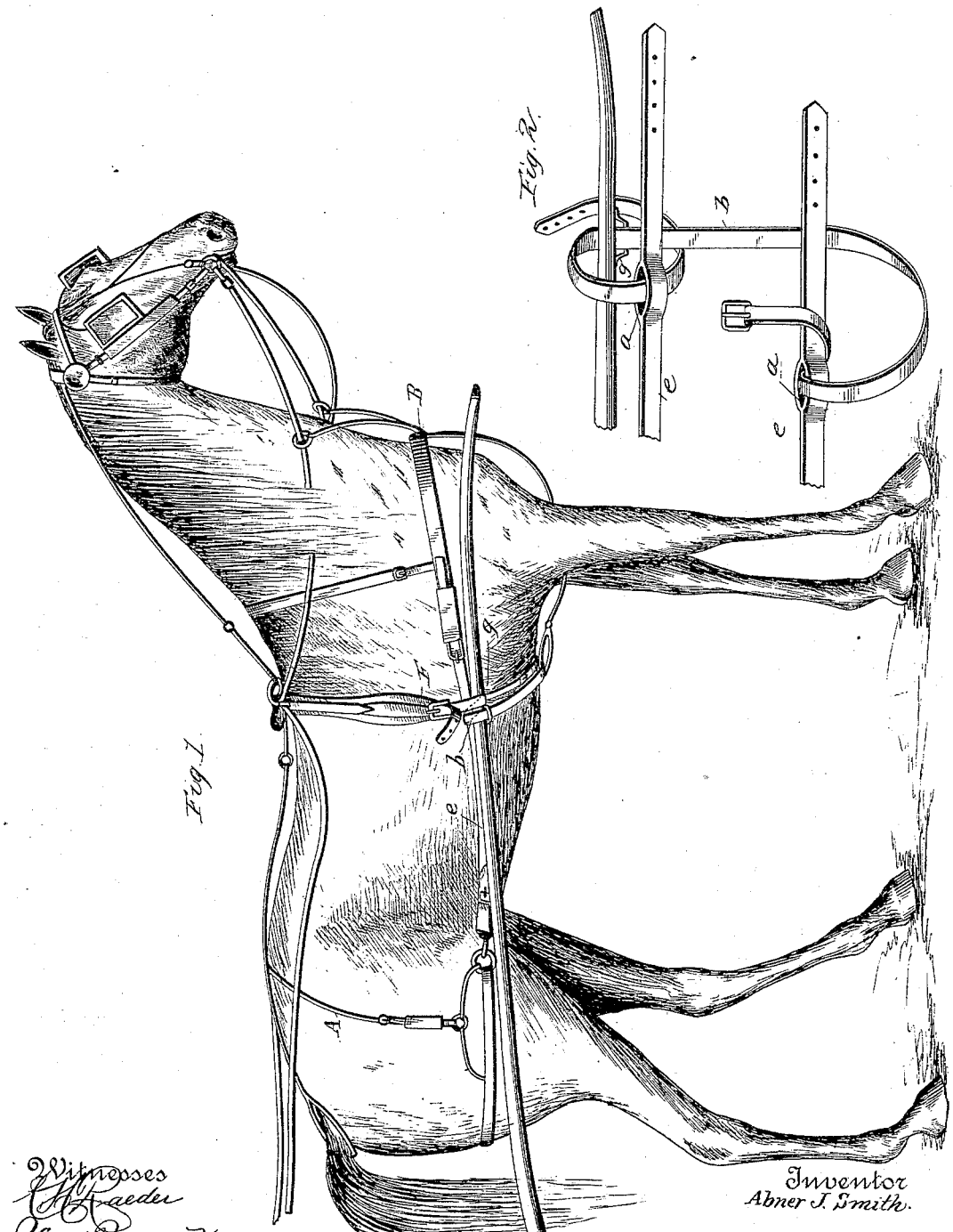
Witnesses
Inventor
Abner J. Smith.
By his Attorneys

UNITED STATES PATENT OFFICE.

ABNER J. SMITH, OF EASTWOOD, KENTUCKY.

HARNESS.

SPECIFICATION forming part of Letters Patent No. 427,630, dated May 13, 1890.

Application filed May 7, 1889. Serial No. 309,945. (No model.)

*To all whom it may concern:*

Be it known that I, ABNER J. SMITH, a citizen of the United States, residing at Eastwood, in the county of Jefferson and State of Kentucky, have invented certain new and useful Improvements in Harness; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to harness, and aims to simplify and reduce the number of the parts of the same by dispensing with the ordinary traces, shaft-holders, backing-straps, and singletree.

The improvement consists of the novel features, which will be hereinafter more fully described and claimed, and shown in the annexed drawings, in which—

Figure 1 is a side view of a harness embodying my invention, showing the application of the same; and Fig. 2 a perspective detail view of the improvement.

The harness, comprising the breeching A and the breast-strap B, is of ordinary construction. The draft-straps or traces $e$ are interposed between and connect the breeching with the breast-strap, being adjustable at each end to adapt them to the size of the horse. The vertical slots $a$ in the traces $e$ receive the strap $b$, which passes beneath the animal's stomach and wraps around the thills and connects with the saddle-straps F. This strap $b$ passes through loops or staples $g$ on the thills and through the slots $a$ in the traces near each end, thus binding all together.

The operation of the attachment and its application is manifest from the foregoing description and the drawings.

Having thus described my invention, what I claim, and desire to secure by Letters Patent, is—

The harness comprising the breeching, the breast-strap, the traces $e$, having openings $a$, and the strap $b$, passing through the openings $a$ and adapted to pass through a staple on the thill and connected with the saddle-straps, substantially as described.

In testimony whereof I affix my signature in presence of two witnesses.

ABNER J. SMITH.

Witnesses:
W. K. STERIN,
MARTHA SMITH.